(12) United States Patent
Andersson et al.

(10) Patent No.: US 8,807,119 B2
(45) Date of Patent: Aug. 19, 2014

(54) POSITIVE DETECTION OF ENGINE POSITION DURING ENGINE STARTING

(75) Inventors: Martin N. Andersson, Caro, MI (US); Cyrus M. Healy, Ubly, MI (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 590 days.

(21) Appl. No.: 13/107,218

(22) Filed: May 13, 2011

(65) Prior Publication Data

US 2011/0303189 A1 Dec. 15, 2011

Related U.S. Application Data

(60) Provisional application No. 61/353,800, filed on Jun. 11, 2010.

(51) Int. Cl.
*F02P 5/00* (2006.01)
(52) U.S. Cl.
USPC .............................. 123/406.11; 123/406.59
(58) Field of Classification Search
USPC ........................................ 123/406.11, 406.59
See application file for complete search history.

(56) References Cited

U.S. PATENT DOCUMENTS

| | | | | |
|---|---|---|---|---|
| 4,255,789 A | * | 3/1981 | Hartford et al. | 701/108 |
| 6,272,425 B1 | | 8/2001 | Herndon | |
| 6,388,445 B1 | * | 5/2002 | Andersson | 324/380 |
| 6,408,820 B1 | | 6/2002 | LaMarr, Jr. | |
| 7,000,595 B2 | * | 2/2006 | Andersson et al. | 123/406.47 |
| 7,040,282 B2 | * | 5/2006 | Andersson et al. | 123/335 |
| 7,198,028 B2 | * | 4/2007 | Andersson et al. | 123/339.11 |
| 2005/0279326 A1 | * | 12/2005 | Andersson et al. | 123/406.47 |

* cited by examiner

*Primary Examiner* — John Kwon
(74) *Attorney, Agent, or Firm* — Reising Ethington P.C.

(57) ABSTRACT

A system for managing ignition of a light-duty internal combustion engine during starting includes a charge winding used to create an ignition pulse; a first signal generated by the charge winding that indicates the speed of an engine; a second signal generated by the charge winding that indicates a piston position of the engine; a switch coupled to the charge winding for controlling the ignition pulse; and a processing device that receives the first signal and the second signal, wherein the processing device activates the switch when a comparison of the received first signal and second signal indicates that a piston is positioned at approximately top dead center (TDC).

27 Claims, 5 Drawing Sheets

US 8,807,119 B2

POSITIVE DETECTION OF ENGINE POSITION DURING ENGINE STARTING

REFERENCE TO RELATED APPLICATIONS

This application claims the benefit of U.S. Provisional Patent Application No. 61/353,800 filed on Jun. 11, 2010.

TECHNICAL FIELD

The present disclosure relates generally to an ignition control system. More specifically, the present disclosure relates to a system that controls the spark timing of a light-duty combustion engine.

BACKGROUND

Various electronic ignition timing control systems used with internal combustion engines are known in the art. These systems can be used with light-duty engines that are used in a wide range of applications, such as lawn equipment, chainsaws, and the like. The starting procedure for these engines often involves a user pulling a rope or cord which rotates the crankshaft of the engine and afterwards the engine begins to operate. However, improvements to the starting procedure are possible.

SUMMARY

A system for managing ignition of a light-duty internal combustion engine during starting includes a charge winding used to create an ignition pulse; a first signal generated by the charge winding that indicates the speed of an engine; a second signal generated by the charge winding that indicates a piston position of the engine; a switch coupled to the charge winding for controlling the ignition pulse; and a processing device that receives the first signal and the second signal, wherein the processing device activates the switch when a comparison of the received first signal and second signal indicates that a piston is positioned at approximately top dead center (TDC).

A method of managing ignition of a light-duty internal combustion engine during starting includes receiving a timing pulse that controls the activation of an ignition pulse from a charge winding of a capacitive discharge ignition system; receiving a piston position pulse from the charge winding that indicates the position of the piston; detecting a voltage change in the received timing pulse; determining if the rate of voltage change of the piston position pulse with respect to time is positive; triggering the ignition pulse based on the detected drop in voltage level of the received timing pulse and the determined rate of voltage change of the piston position pulse, thereby preventing ignition at piston positions other than approximately top dead center (TDC).

A method of managing ignition of a light-duty internal combustion engine during starting can also include generating a timing pulse that controls the activation of an ignition pulse using a charge winding of a capacitive discharge ignition system; generating a piston position pulse that indicates the position of the piston using the charge winding; detecting a voltage change in the generated timing pulse and the time at which the voltage change is detected; calculating the time between the detected voltage change and the maximum amplitude of the generated piston position pulse; determining if a slow pull cranking condition exists based on the calculated time; if so, determining that the rate of voltage change of the piston position pulse with respect to time is positive; and triggering the ignition pulse based on the determination.

DETAILED DESCRIPTION OF THE PREFERRED EMBODIMENT(S)

The following description relates to a system and method that can more accurately provide spark timing during the starting sequence of a light internal combustion engine. Often these engines are started by hand using a manual implement such as a pull cord. As a result, the speed at which the engine is started can be slow and the motion uneven. In those situations, the motion of a piston can also be uneven. For example, the piston can momentarily reverse its motion as it approaches top-dead center (TDC). When this occurs, ignition systems can incorrectly determine the point at which sparking should occur and generate noticeable "kickback" to the user if sparking does not occur around TDC. In an effort to better predict piston position, the characteristics of a plurality of induced inputs can be used to determine ignition/spark during engine starting. The system and method described can be used until the engine reaches a threshold number of revolutions per minute (RPM) at which time spark timing can be advanced or retarded according to established values.

Referring to the figures, there is shown a capacitive discharge ignition (CDI) system 10 for use with an internal combustion engine. CDI system 10 can be used with one of a number of types of internal combustion engines, but is particularly well suited for use with light-duty combustion engines. The term 'light-duty combustion engine' broadly includes all types of non-automotive combustion engines, including two- and four-stroke engines used with hand-held power tools, lawn and garden equipment, lawnmowers, weed trimmers, edgers, chain saws, snowblowers, personal watercraft, boats, snowmobiles, motorcycles, all-terrain-vehicles, etc. As will be explained in greater detail, CDI system 10 can include one of a number of control circuits, including the exemplary embodiment described in relation to FIG. 2.

Figure 1:
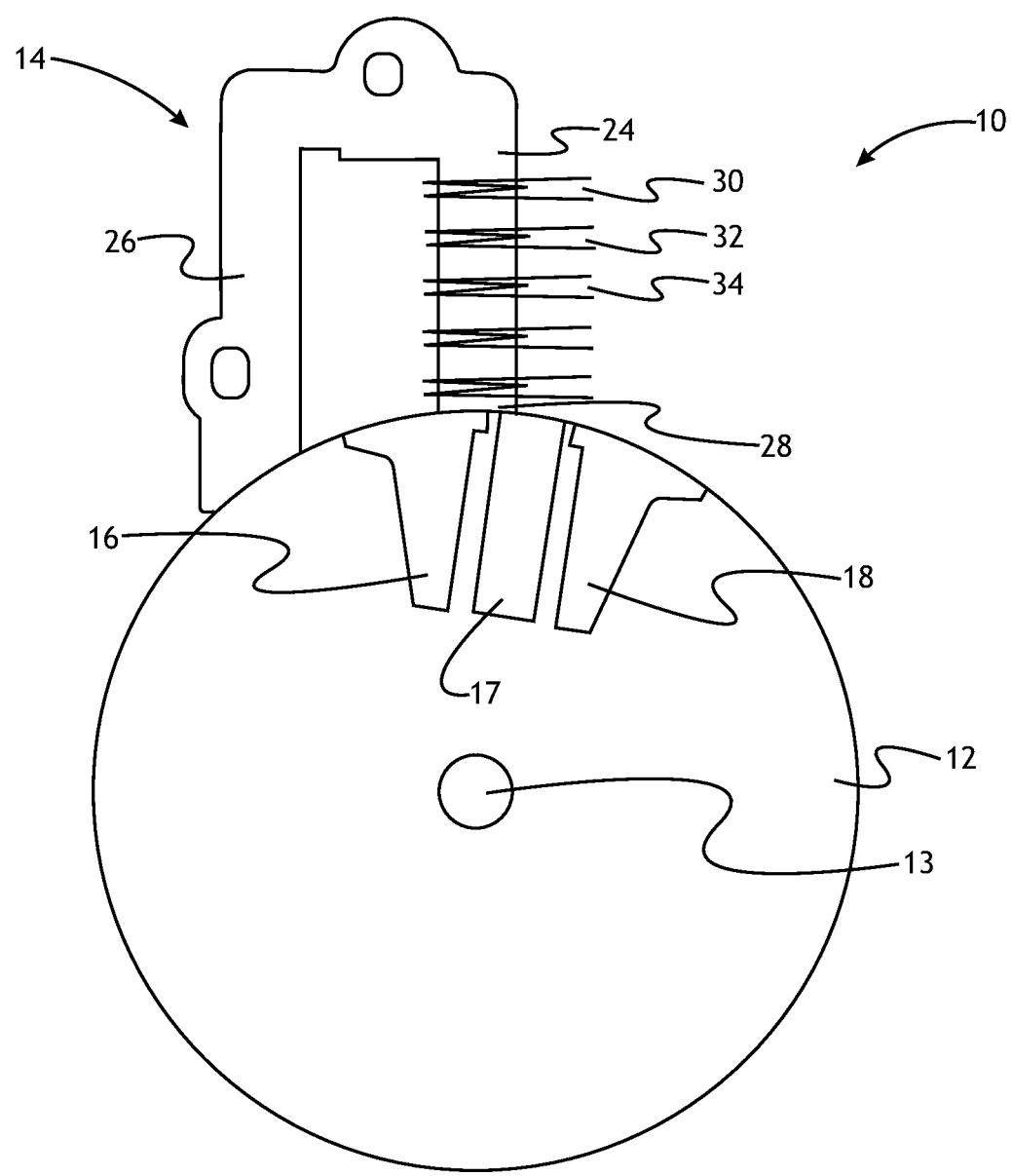
FIG. 1 shows a capacitor discharge ignition (CDI) system generally having a stator assembly mounted adjacent a rotating flywheel.

With reference to FIG. 1, CDI system 10 generally includes a flywheel 12 rotatably mounted on an engine crankshaft 13, a stator assembly 14 mounted adjacent the flywheel, and a control circuit (not shown in FIG. 1). Flywheel 12 rotates with the engine crankshaft 13 and generally includes a permanent magnetic element having pole shoes 16, 18, and permanent magnet 17, such that it induces a magnetic flux in the nearby stator assembly 14 as the magnets pass thereby.

Stator assembly 14 may be separated from the rotating flywheel 12 by a measured air gap (e.g. the air gap may be 0.3 mm), and may include a lamination stack 24 having first and second legs 26, 28, a charge winding 30 and an ignition coil comprising primary and secondary ignition windings 32, 34.

The lamination stack 24 may be a generally U-shaped ferrous armature made from a stack of iron plates, and may be mounted to a housing (not shown) located on the engine. Preferably, the charge winding 30 and primary and secondary ignition windings 32, 34 are all wrapped around a single leg of lamination stack 24. Such an arrangement may result in a cost savings due to the use of a common ground and a single spool or bobbin for all of the windings. The ignition coil may be a step-up transformer having both the primary and secondary ignition windings 32, 34 wound around second leg 28 of the lamination stack 24. Primary ignition winding 32 is coupled to the control circuit, as will be explained, and the secondary ignition winding 34 is coupled to a spark plug 42 (shown in FIG. 2). As is appreciated by those skilled in the art, primary ignition winding 32 may have comparatively few turns of relatively heavy wire, while secondary ignition winding 34 may have many turns of relatively fine wire. The ratio of turns between the primary and secondary ignition windings 32, 34 generates a high voltage potential in the secondary winding 34 that is used to fire spark plug 42 or provide an electric arc and consequently ignite an air/fuel mixture in the engine combustion chamber.

The control circuit is coupled to stator assembly 14 and spark plug 42 and generally controls the energy that is induced, stored and discharged by CDI system 10. The term "coupled" broadly encompasses all ways in which two or more electrical components, devices, circuits, etc. can be in electrical communication with one another; this includes but is certainly not limited to, a direct electrical connection and a connection via an intermediate component, device, circuit, etc. The control circuit can be provided according to one of a number of embodiments, including an exemplary embodiment shown in FIG. 2.

Figure 2:
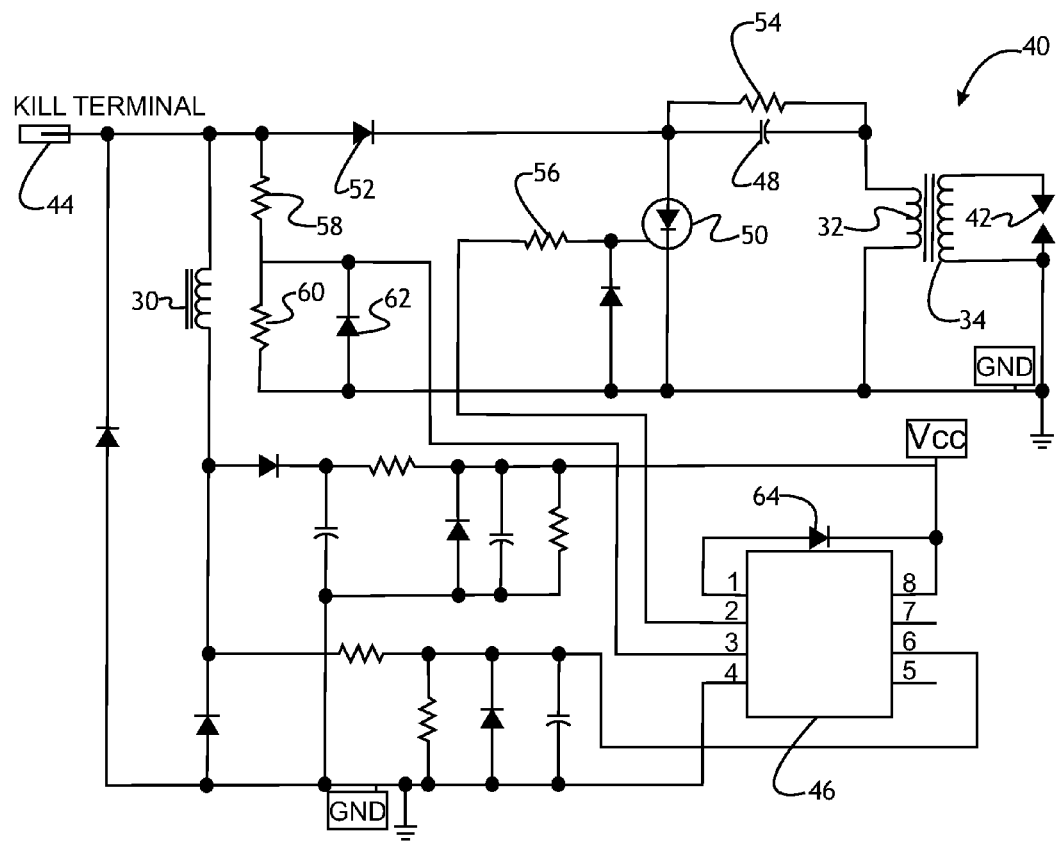
FIG. 2 is a is a schematic diagram of an embodiment of a control circuit that can be used with the CDI system of FIG. 1.

Referring now to FIG. 2, the CDI system 10 includes circuit 40 as an example of the type of circuit that may be used to implement the ignition timing systems described herein. However, many variations of this circuit may alternatively be used without departing from the scope of the invention. Circuit 40 interacts with charge winding 30, primary ignition winding 32, and a kill switch 44, and generally comprises a microcontroller 46, an ignition discharge capacitor 48, and an ignition switch 50. The majority of the energy induced in charge winding 30 is dumped onto ignition discharge capacitor 48, which stores the induced energy until the microcontroller 46 permits it to discharge. According to an embodiment shown here, a positive terminal of charge coil 30 is coupled to a diode 52, which in turn is coupled to ignition discharge capacitor 48. A resistor 54 may be coupled in parallel to the charge ignition discharge capacitor 48.

During operation, rotation of flywheel 12 causes the magnetic elements, such as pole shoes 16, 18, to induce voltages in various coils arranged around the lamination stack 24. One of those coils is charge winding 30, which charges ignition discharge capacitor 48 through diode 52. A trigger signal from the microcontroller 46 activates switch 50 so that the ignition discharge capacitor 48 can discharge and thereby create a corresponding ignition pulse in ignition coil. In one example, the ignition switch 50 can be a thyristor, such as a silicon controller rectifier (SCR). When the ignition switch 50 is turned 'on' (in this case, becomes conductive), the switch 50 provides a discharge path for the energy stored on ignition discharge capacitor 48. This rapid discharge of the ignition discharge capacitor 48 causes a surge in current through the primary ignition winding 32 of the ignition coil, which in turn creates a fast-rising electro-magnetic field in the ignition coil. The fast-rising electro-magnetic field induces a high voltage ignition pulse in secondary ignition winding 34. The ignition pulse travels to spark plug 42 which, assuming it has the requisite voltage, provides a combustion-initiating spark. Other sparking techniques, including flyback techniques, may be used instead.

The microcontroller 46 as shown in FIG. 2 can store code for the ignition timing systems described herein. Various microcontrollers or microprocessors may be used, as is known to those skilled in the art. The microcontroller 46 shown in FIG. 2 includes 8 pins. Pins 1 and 8 of the microcontroller 46 are coupled to a voltage source which supplies the microcontroller 46 with power. In this example, pin 1 is a reset pin that is coupled to the voltage source via a zener diode 64. Pin 2 is coupled to the gate of ignition switch 50 via resistor 56 and transmits from the microcontroller 46 an ignition signal which controls the state of the switch 50. When the ignition signal on pin 2 is low, the ignition switch 50 is nonconductive and capacitor 48 is allowed to charge. When the ignition signal is high, the ignition switch 50 is conductive and ignition discharge capacitor 48 discharges through primary ignition winding 32, thus causing an ignition pulse to be induced in secondary ignition winding 34 and sent to spark plug 42. Thus, the microcontroller 46 governs the discharge of capacitor 48 by controlling the conductive state of the switch 50. Pin 3 receives a piston position signal from the charge winding 30. The piston position signal can also be referred to as a positive pulse. Pin 3 is coupled to the charge winding 30 via a voltage divider that includes resistors 58 and 60 and a zener diode 62. Kill switch 44 acts as a manual override for shutting down the engine. Pin 4 acts as a ground reference for the microcontroller 46. Pin 6 is coupled to the charge winding 30 and receives an electronic signal representative of the engine speed. This signal can be referred to as a timing signal or a negative pulse. However, while the terms "positive" and "negative" have been used herein, it should be appreciated that these terms can be reversed depending on a variety of factors, such as the direction of the windings of the charge winding 30. The microcontroller 46 can use the timing signal and the piston position signal to determine whether or not to activate an ignition pulse, as will be subsequently explained in greater detail below with respect to FIG. 3.

Figure 3A:
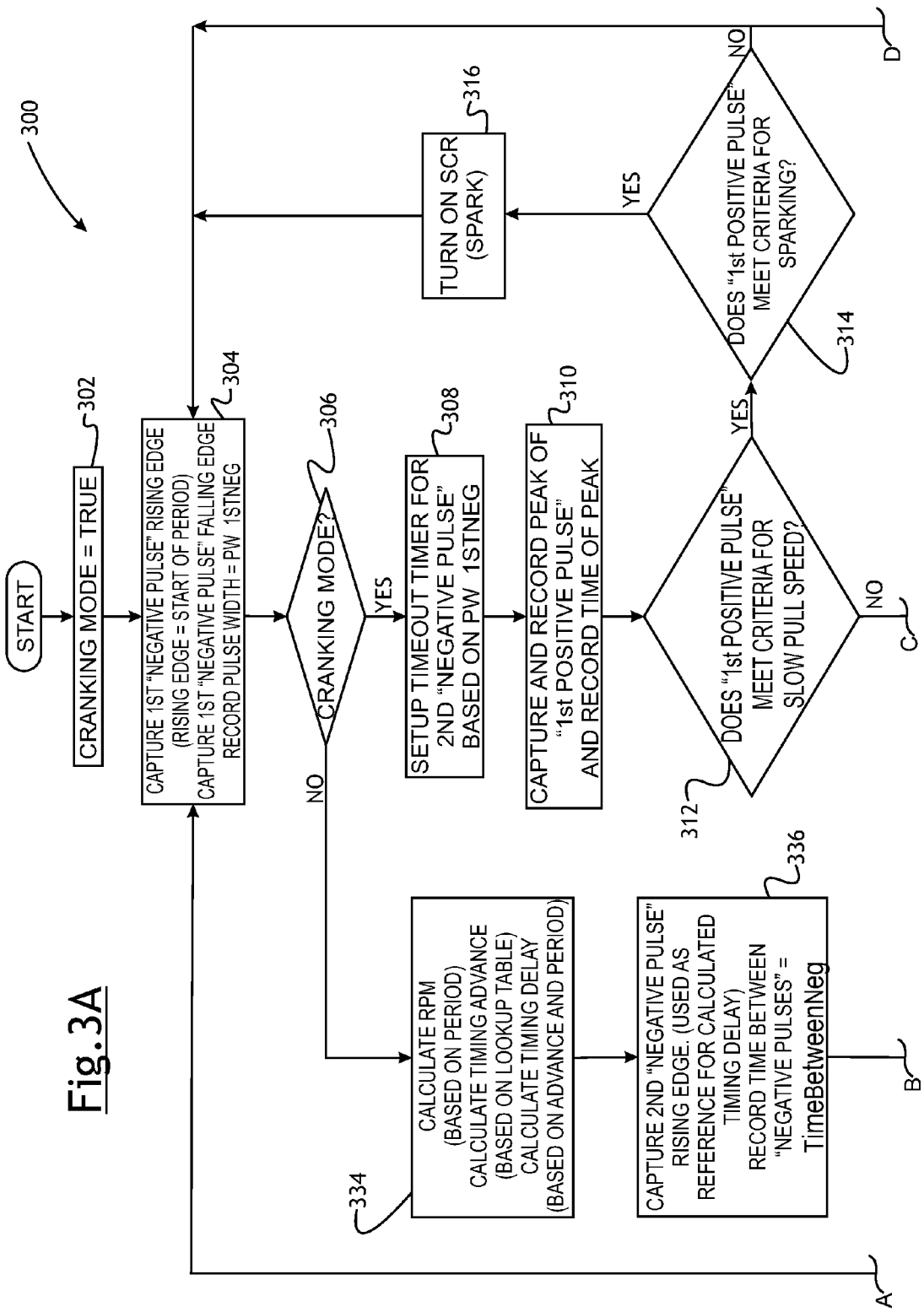
FIG. 3A is a portion of a flow chart of an embodiment of a method that can be used to control the CDI system.
Figure 3B:
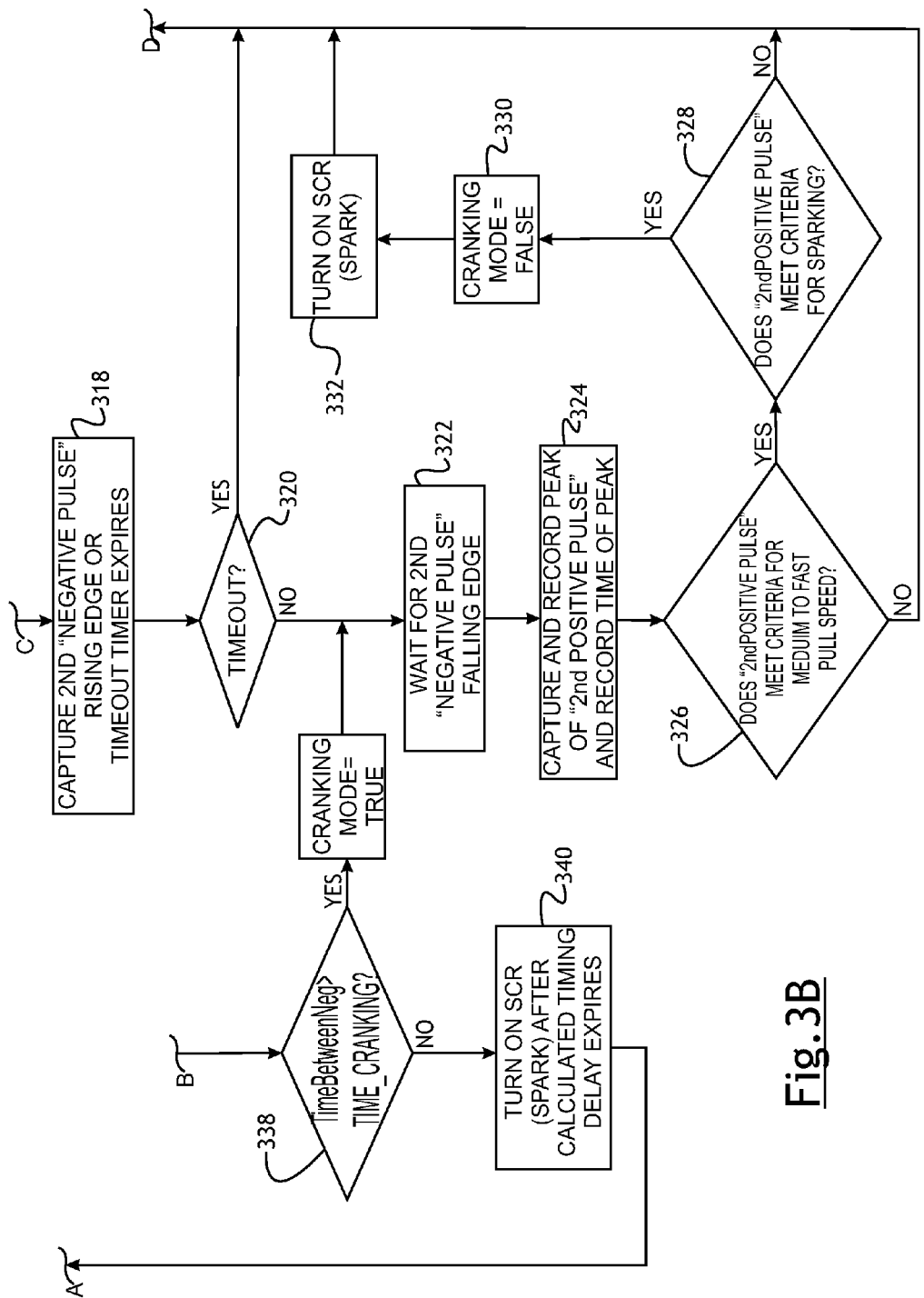
FIG. 3B is another portion of a flow chart of an embodiment of a method that can be used to control the CDI system.
Figure 4:
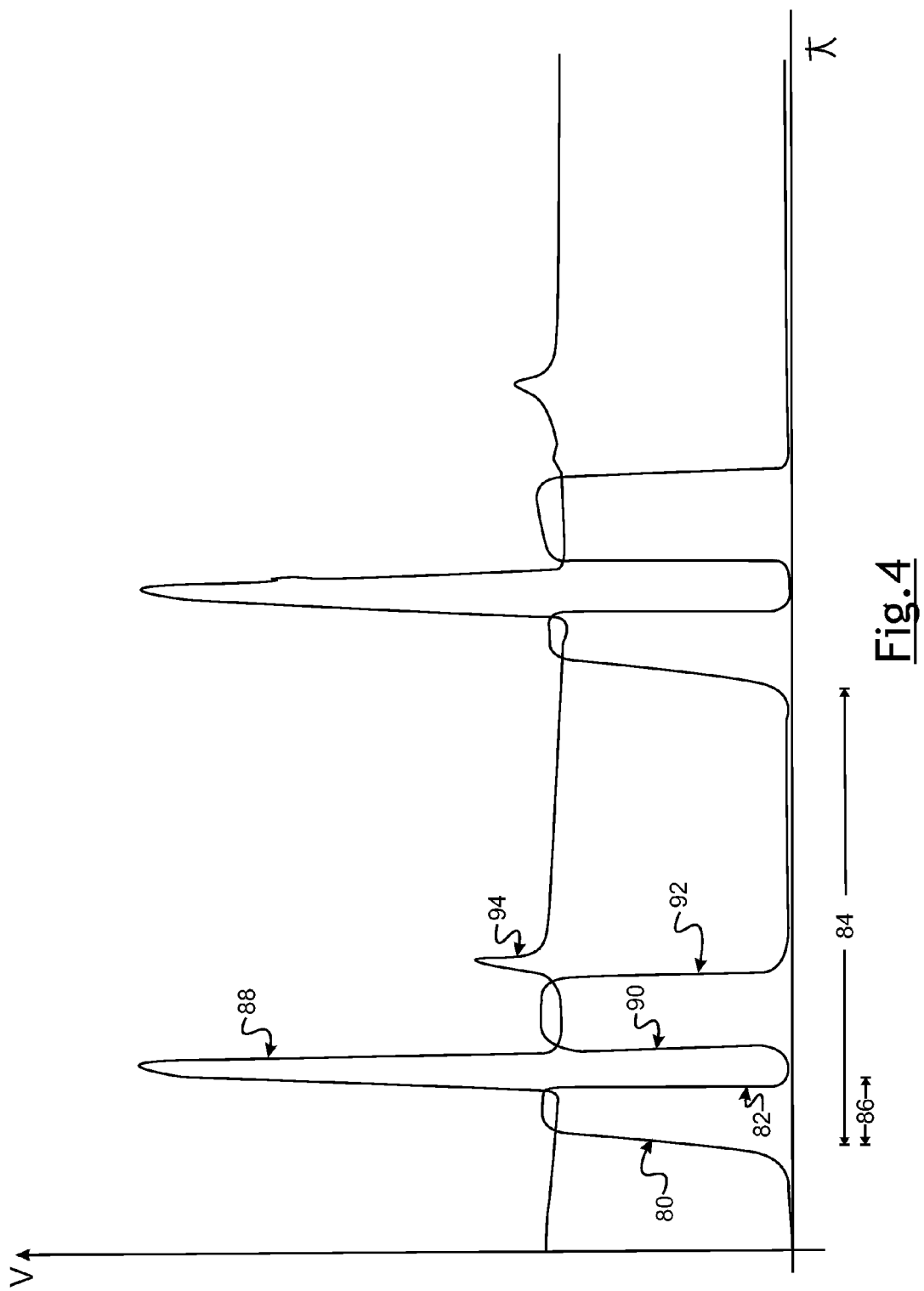
FIG. 4 is a graph showing exemplary waveforms of timing signals and piston position signals.

Turning to FIG. 3, an exemplary method 300 for controlling a CDI system is shown. While the method 300 mainly will be described with reference to FIG. 3, occasional reference will be made to FIG. 4 in order to point out example waveforms of the signals discussed herein. The method 300 begins at step 302 by initially setting the engine cranking mode to 'TRUE'. This can be the result of an engine operator attempting to start the engine, such as would occur when the engine operator began pulling a starter cord to turn the flywheel 12 or turned an ignition switch to 'on' or 'start'. The method 300 then proceeds to step 304 and a first measurement of the timing signal is taken. The first measurement(s) may include a time value at the rising edge of a first timing pulse and a time value at the falling edge of the first timing pulse. An example of the first timing pulse can be seen in FIG. 4; the rising edge of the first timing pulse is generally indicated at 80 while the falling edge of the first timing pulse is generally indicated at 82. The rising edge of the first timing pulse can mark the beginning of a period over which the method 300 is carried out. Or in one example, the period over which the method is carried out can be defined as one revolution of the engine crankshaft. An example of this period is generally shown at 84 in FIG. 4. The first measurement(s) can also include calculating the pulse width of the first timing pulse based on the time values of the rising and falling edges of the first timing pulse. An example of the pulse width is generally shown at 86 in FIG. 4. The first timing pulse can also be referred to as the first negative pulse. The method 300 then proceeds to step 306.

At step 306, it is determined whether a cranking mode has been established. If 'TRUE', then the method 300 proceeds to step 308. The cranking mode generally exists before a first spark has been generated by the ignition system during cranking. Otherwise, the method 300 then proceeds to step 334.

At step 308, a timer is activated for a second timing pulse based on the pulse width of the first timing pulse. The timer can be used to determine if subsequent timing pulses are received at expected times. Or the timer can ensure that the method 300 remains in a cranking mode. For instance, the timer can be used to determine if a slow cranking speed condition exists. The method 300 then proceeds to step 310.

At step 310, a first piston position pulse is captured and recorded. The first piston position pulse can be obtained as a measurement of the piston position and can also be referred to as a first positive pulse. In one example, a time value at which the first piston position pulse reaches maximum amplitude is captured during a period of engine revolution, as well as the maximum amplitude. An example of the first piston position pulse in generally shown at 88 in FIG. 4. The method 300 then proceeds to step 312.

At step 312, it is determined whether the first piston position pulse indicates the presence of a slow pull speed. Slow pull speed can refer to the relative rotational speed of the flywheel as the engine operator attempts to start the engine. To help identify the existence of slow pull speed, certain criteria can be established. For example, the existence of slow pull speed can be established when the maximum amplitude of the first piston position pulse falls between 0.2 and 0.8 volts (V) and the time value of the maximum amplitude of the first piston position pulse is delayed relative to normal operation. In one example, the amount of delay of the piston position pulse relative to normal operation can be established as the pulse width of the first timing pulse divided by 4 and added to the falling edge of the first timing pulse. If the maximum amplitude occurs later than the established amount of delay, a slow pull speed may exist. This occurrence can be monitored using the timer. If the maximum amplitude of the first piston position pulse occurs after the amount of delay added to the falling edge of the first timing pulse and/or the maximum amplitude of the piston position pulse falls between 0.2 and 0.8 V, then it may be determined that a slow speed pull is present. A slow-speed pull can also be determined when the first piston position pulse is detected and not followed by the detection of other pulses before a predetermined amount of time measured by the timer expires. If the timer expires before a second piston position pulse is detected, then a slow pull speed condition can be determined to exist. If a slow pull speed is present, the method 300 then proceeds to step 314. Otherwise, the method 300 then proceeds to step 318.

When a slow speed pull is present, it is determined whether the piston position pulse indicates sparking should occur at step 314. Sparking can refer to the microcontroller 46 activating the ignition switch 50 to induce sparking in the spark plug 42, as discussed with respect to FIG. 2. To determine whether the first piston position pulse indicates sparking should occur, certain criteria can be established. For example, one of those criteria can be the rate of voltage change with respect to time during the first piston position pulse (e.g. dV/dt). If the rate of voltage change with respect to time either remains the same or increases from the beginning of the piston position pulse until the maximum amplitude of the first piston position pulse is detected, then sparking can occur. Or in other words, if the waveform of the piston position pulse is concave, then sparking can occur. When the rate of voltage change is positive with respect to time, this can indicate that the piston is gaining speed and is therefore moving forward. However, when the rate of voltage change is negative, this can indicate that the piston is slowing down, which can occur during slow speed cranking conditions and lead to kickback. If sparking should occur, then the ignition switch 50 discussed with respect to FIG. 2 can be turned 'on' at step 316 during a subsequent piston position signal—an example of which will be described later as a second piston position pulse. The method 300 proceeds to step 304.

Referring back to step 312, if a slow speed pull is not present, a second timing pulse is captured at step 318 in a way similar to the capture of the first timing pulse at step 304. Here, a time value of the rising edge of the second timing pulse is measured. An example of the rising edge of the second timing pulse is generally shown at 90 in FIG. 4. The method 300 then proceeds to step 320.

At step 320, it is determined whether the timer set during step 308 has expired. If so, the method then proceeds to step 304. Otherwise, the method 300 then proceeds to step 322.

At step 322, the method 300 monitors for the falling edge of the second timing pulse. An example of the falling edge of the second timing pulse is generally shown at 92 in FIG. 4. The method 300 then proceeds to step 324.

At step 324, a second piston position pulse is detected. The maximum amplitude of the second piston position pulse is recorded as well as a time value at which the maximum amplitude of the second piston position pulse occurred. Sparking can be triggered by the second piston position pulse. For instance, the spark can be triggered at the maximum amplitude of the second piston position pulse or at any time during the second piston position pulse. An example of the second piston position pulse is generally shown at 94 in FIG. 4. The second piston pulse 94 may coincide with the piston reaching approximately TDC or a region of and including TDC. TDC can be described as the position of the engine piston when the piston is at the top of its stroke. TDC and/or the region including TDC may further be described by an angular position of the crankshaft from 5 degrees before the point at which the piston is located at TDC to 15 degrees after the piston is located at TDC. A more specific range of angular positions may include 3 degrees before the piston is positioned at TDC to 3 degrees after the piston is positioned at TDC. The method 300 then proceeds to step 326.

At step 326, it is determined whether the second piston position pulse indicates the presence of a medium to fast pull speed. Similar to the slow pull speed discussed above, medium to fast pull speeds can refer to the relative rotational speed of the flywheel as the engine operator attempts to start the engine. And certain criteria can be established for determining whether a medium or fast pull speed exists. For example, if it is determined that the maximum amplitude of the second piston position pulse is a value between 0.5 to 1.5 V and/or the time value of the maximum amplitude of the second piston position pulse is not delayed relative to normal operation, then a medium to fast pull speed may be present. For example, the method 300 can determine that the time value of the maximum amplitude of the second piston position pulse is not delayed relative to normal operation by determining that time value occurs within a predetermined time after the time value of the falling edge of the first and/or second timing pulse. In one example, the predetermined time can be calculated as the pulse width of the second timing pulse multiplied by two. If the maximum amplitude of the second piston position pulse occurs within the predetermined time, the method 300 then proceeds to step 328. Otherwise, the method 300 proceeds to step 304.

At step 328, it is determined whether the second piston position pulse indicates sparking should occur. This determination can be carried out in a similar manner as is done in step 314. The triggering of spark can be based on the second piston potion pulse and can occur during or soon after this pulse. Additionally, if the second piston position pulse becomes larger with respect to the first piston position pulse, this can indicate that the piston has slowed or stopped momentarily and may begin to move in an opposite direction. For example, during a fast pull speed condition, the first piston position pulse can be four or more times greater in magnitude (volts) than the second piston position pulse. On the other hand, during slow pull speed conditions, the first piston position pulse may be less than three times greater in magnitude than the second piston position pulse. If sparking should occur, the method 300 proceeds to step 330 in which the cranking mode is determined (e.g. set) to be 'FALSE' and the ignition switch is activated at step 332 in a manner similar to step 316. If the second piston position pulse indicates sparking should not occur, then the method 300 proceeds to step 304.

Referring back to step 306, if it is determined that a cranking mode does not exist, then the method 300 proceeds to step 334 and the engine RPM is calculated based on the period (e.g. one engine revolution) of the first timing pulse and a timing delay is calculated. The cranking mode may not exist after the user has begun cranking and a spark has been generated. The method 300 then proceeds to step 336.

At step 336, a time value of the rising edge of the second timing pulse is captured. This time value can be used as a reference for calculating an engine timing delay. Additionally, the time between the falling edge of the first timing pulse and the rising edge of the second timing pulse can be calculated. This calculation can be called the time between timing pulses. The method 300 then proceeds to step 338.

At step 338, it is determined whether the time between the timing pulses is greater than a predetermined time. If so, the cranking mode is set to 'TRUE' and the method 300 then proceeds to step 322. Otherwise, the method 300 then proceeds to step 340 and the ignition switch is turned on after the timer expires and the method then proceed to step 304.

The interpretation and characterization of the timing signal and the piston position signal help provide greater control over sparking as the piston approaches TDC and thereby eliminate the "kickback" felt by engine operators during starting. Without the interpretation of the timing signal and the piston position signal it is possible that the magnetic field induced during engine startup can collapse when the piston momentarily stops or begins backward movement. In those cases, the use of a timing signal by itself can erroneously indicate to a control system that a piston is reaching TDC and initiate a poorly-timed spark. For example, during a situation when the piston stops moving or begins to move backward, the induced magnetic field collapses—as also occurs when the piston approaches TDC. As a result, a control circuit that interprets only the timing signal may erroneously infer from the stopping or backward motion of the piston—as can happen during uneven cranking—that the piston has reached TDC and permit sparking. This erroneous sparking can undesirably cause backfiring. In response, the combination of the timing signal and the piston position signal can prevent sparking until the piston actually reaches the vicinity of TDC.

It will thus be apparent that there has been provided in accordance with the present invention an ignition timing control system for use with a low cost, light duty combustion engine which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

The invention claimed is:

1. A system for managing ignition of a light-duty internal combustion engine during starting, the system comprising:
   a charge winding that induces charge for an ignition pulse, a first terminal of the charge winding is arranged to generate a first signal indicating a speed of the engine and a second terminal of the charge winding is arranged to generate a second signal indicating a piston position of the engine;
   an ignition discharge capacitor coupled to the charge winding, the ignition discharge capacitor stores the induced charge from the charge winding;
   a switch coupled to the ignition discharge capacitor, the switch discharges the stored charge from the ignition discharge capacitor; and
   a processing device coupled to the switch, the processing device receives the first signal and the second signal and controls the state of the switch, wherein the processing device is configured to activate the switch during a starting sequence when a comparison of the received first signal and second signal indicates that a piston is positioned in the region of top dead center (TDC).

2. The system of claim 1, wherein the processing device when is configured to determine if the rate of voltage change with respect to time of the second signal is negative or non-negative.

3. The system of claim 1, further comprising:
   a lamination stack having a first leg and a second leg, wherein the charge winding and an ignition coil are carried by either the first leg or the second leg.

4. The system of claim 1, wherein the first signal is generated with a polarity that is opposite of the polarity of the second signal.

5. The system of claim 1, wherein the piston is in the region of TDC when an angular position of a crankshaft measured from 5 degrees before the point at which the piston is located at TDC to 15 degrees after the piston is located at TDC.

6. A method of managing ignition of a light-duty internal combustion engine during starting, comprising the steps of:
   (a) receiving a timing pulse that indicates the speed of the engine;
   (b) receiving a piston position pulse that indicates the position of the piston;
   (c) detecting a drop in a voltage level of the received timing pulse;
   (d) determining if the rate of voltage change of the piston position pulse with respect to time is negative or non-negative; and
   (e) triggering an ignition pulse based on the detected drop in voltage level of the received timing pulse and the determined rate of voltage change of the piston position pulse, thereby preventing activation of the ignition pulse at piston positions other than approximately top dead center (TDC).

7. The method of claim 6, further comprising the step of determining that a slow cranking condition exists by measuring the maximum amplitude of the piston position pulse or the time during an engine revolution at which the maximum amplitude of the piston position pulse is measured.

8. The method of claim 7, wherein the slow cranking condition exists when the maximum amplitude of the piston position pulse is less than three times as large as a maximum amplitude of a second piston position pulse.

9. The method of claim 7, further comprising the step of determining that a slow cranking condition exists by measuring the elapsed time between the detected voltage level drop of the received timing pulse and the time at which the maximum amplitude of the piston position pulse is measured.

10. The method of claim 9, further comprising the step of determining that a slow cranking condition exists when the elapsed time between the detected voltage level drop and the maximum amplitude of the piston position pulse is greater than a time threshold.

11. The method of claim 10, wherein the time threshold is calculated as the pulse width of the timing pulse divided by four and measured from the time the voltage drop of the received timing pulse is detected.

12. The method of claim 6, further comprising the step of determining that a medium to fast pull speed condition is present based on the amplitude of the piston position pulse or the time during an engine revolution at which the amplitude of the piston position pulse is measured.

13. The method of claim 12, further comprising the step of determining that the medium to fast pull speed condition is present when the amplitude of the piston position pulse is more than four times as large as the maximum amplitude of a second piston position pulse.

14. The method of claim 12, further comprising the step of determining that the medium to fast pull speed condition exists when the elapsed time between the detected voltage level drop and the maximum amplitude of the piston position pulse is less than a time threshold.

15. The method of claim 14, wherein the time threshold is calculated as the amount of time of the pulse width of the timing pulse multiplied by two.

16. The method of claim 6, wherein the ignition pulse is generated during a second piston position pulse.

17. The method of claim 6, wherein TDC further comprises an angular position of a crankshaft measured from 5 degrees before the point at which the piston is located at TDC to 15 degrees after the piston is located at TDC.

18. A method of managing ignition of a light-duty internal combustion engine during starting, comprising the steps of:
  (a) generating a timing pulse that indicates the speed of the engine using a charge winding of a capacitive discharge ignition system;
  (b) generating a piston position pulse that indicates the position of a piston using the charge winding;
  (c) detecting a voltage change in the generated timing pulse and the time at which the voltage change is detected;
  (d) calculating the time between the detected voltage change and the maximum amplitude of the generated piston position pulse;
  (e) determining if a slow pull cranking condition exists based on the calculation in step (d);
  (f) if so, determining that the rate of voltage change of the piston position pulse with respect to time is positive; and
  (g) triggering the ignition pulse based on the determination in step (f).

19. The method of claim 18, further comprising the step of determining that the calculated time between the detected voltage change and a predetermined point of the generated piston position pulse is greater than a pulse width of the timing pulse divided by four.

20. The method of claim 18, further comprising the step of triggering the ignition pulse based on a second piston position pulse.

21. A method of managing ignition of a light-duty internal combustion engine during starting, comprising the steps of:
  generating a first signal from a first terminal of a charge winding, the first signal indicates a speed of the engine, a position of the engine, or both during an engine starting sequence;
  generating a second signal from a second terminal of the charge winding, the second signal indicates a speed of the engine, a position of the engine, or both during the engine starting sequence;
  receiving the first and second signals at a processing device;
  evaluating both the first and second signals with the processing device to determine an ignition timing for the engine; and
  triggering an ignition pulse with the processing device, wherein the ignition pulse is triggered during the engine starting sequence when the engine is in the region of top-dead-center.

22. The method of claim 21, wherein the evaluating step further comprises: detecting a change in the first signal, detecting a maximum amplitude of the second signal, and comparing the amount of time between the change in the first signal and the maximum amplitude of the second signal to a time threshold.

23. The method of claim 22, wherein the time threshold is equal to a pulse width of the first signal divided by a predetermined number.

24. The method of claim 22, wherein the comparing step further comprises comparing the maximum amplitude of the second signal to one or more predetermined amplitude values.

25. The method of claim 21, wherein the evaluating step further comprises: determining a rate of change for at least a portion of the second signal, and determining if the rate of change for at least the portion of the second signal is greater than or equal to zero.

26. The method of claim 21, wherein the evaluating step further comprises: determining a maximum amplitude of a first pulse in the second signal, determining a maximum amplitude of a second pulse in the second signal, and comparing the maximum amplitudes of the first and second pulses of the second signal.

27. The method of claim 26, wherein the comparing step further comprises comparing the maximum amplitude of the first pulse of the second signal to a predetermined multiple of the maximum amplitude of the second pulse of the second signal.

* * * * *

UNITED STATES PATENT AND TRADEMARK OFFICE
CERTIFICATE OF CORRECTION

| | | |
|---|---|---|
| PATENT NO. | : 8,807,119 B2 | Page 1 of 1 |
| APPLICATION NO. | : 13/107218 | |
| DATED | : August 19, 2014 | |
| INVENTOR(S) | : Andersson et al. | |

It is certified that error appears in the above-identified patent and that said Letters Patent is hereby corrected as shown below:

In the Claims

Col. 8, Line 32, Claim 2 before "is" insert -- when --.

Signed and Sealed this
Twenty-eighth Day of October, 2014

Michelle K. Lee
*Deputy Director of the United States Patent and Trademark Office*